United States Patent
Jallade et al.

(10) Patent No.: US 11,307,077 B2
(45) Date of Patent: Apr. 19, 2022

(54) METHOD FOR THERMALLY GAUGING THE TANK OF A SPACECRAFT AND A SPACECRAFT EQUIPPED WITH MEANS FOR IMPLEMENTING SUCH A METHOD

(71) Applicant: AIRBUS DEFENCE AND SPACE SAS, Toulouse (FR)

(72) Inventors: Sophie Jallade, Toulouse (FR); Mathieu Monge-Cadet, Toulouse (FR); Sylvain Arnaud, Toulouse (FR); Barbara Busset, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 218 days.

(21) Appl. No.: 16/468,200

(22) PCT Filed: Dec. 8, 2017

(86) PCT No.: PCT/EP2017/082033
§ 371 (c)(1),
(2) Date: Jun. 10, 2019

(87) PCT Pub. No.: WO2018/104521
PCT Pub. Date: Jun. 14, 2018

(65) Prior Publication Data
US 2019/0390996 A1     Dec. 26, 2019

(30) Foreign Application Priority Data
Dec. 9, 2016   (FR) .......................................... 1662242

(51) Int. Cl.
*G01F 23/24*     (2006.01)
*B64G 1/40*      (2006.01)
(Continued)

(52) U.S. Cl.
CPC ............ *G01F 23/247* (2013.01); *B64G 1/402* (2013.01); *F17C 13/008* (2013.01); *F17C 13/026* (2013.01)

(58) Field of Classification Search
CPC ......... G01F 23/22–248; B64G 1/40–48; F17C 13/008; F17C 13/026; F17C 13/028; F17C 2250/0426; F17C 2250/0428
See application file for complete search history.

(56) References Cited

U.S. PATENT DOCUMENTS 4,741,502 A * 5/1988 Rosen .................... B64G 1/007
                                                          244/158.9
4,898,030 A * 2/1990 Yeh ........................ B64G 1/402
                                                          244/135 R
(Continued)

FOREIGN PATENT DOCUMENTS

| EP | 2103863 A1 | 9/2009 |
| EP | 269918 A1 | 8/2014 |
| FR | 2735227 A1 | 12/1996 |

OTHER PUBLICATIONS

International Search Report, dated Mar. 29, 2018, from corresponding PCT application No. PCT/EP2017/082033.
(Continued)

*Primary Examiner* — Justin N Olamit
(74) *Attorney, Agent, or Firm* — Nixon & Vanderhye P.C.

(57) ABSTRACT

Disclosed is a method for gauging the liquid propellant tank of a spacecraft during a phase of high-thrust along an axis, the tank being thermally conductive and having a known geometry. The method includes steps of: attaching, on a wall of the tank, a heating member and at least one temperature sensor in proximity to the heating member and in a plane of interest perpendicular to the thrust axis; during the high-thrust phase, heating the wall of the tank and acquiring temperature measurements of the wall of the tank at rapid (Continued)

frequency; determining the instant I when the temperature measured by the sensor changes, such change indicating the presence of the liquid-gas interface in the tank in the plane of interest; and determining the volume of liquid propellant present in the tank at instant I.

21 Claims, 3 Drawing Sheets

(51) Int. Cl.
*F17C 13/00* (2006.01)
*F17C 13/02* (2006.01)

(56) References Cited

U.S. PATENT DOCUMENTS

| | | | |
|---|---|---|---|
| 5,209,115 A | 5/1993 | Bond | |
| 5,687,607 A * | 11/1997 | Brandt | B64G 1/402 |
| | | | 73/290 R |
| 8,438,919 B2 * | 5/2013 | Phillips | G01F 23/242 |
| | | | 73/295 |
| 8,620,603 B1 * | 12/2013 | Hicks | G01F 23/266 |
| | | | 702/55 |
| 9,074,921 B1 | 7/2015 | Parker, Jr. et al. | |
| 10,065,751 B2 * | 9/2018 | Kawahara | B64G 1/402 |
| 10,107,667 B2 * | 10/2018 | Cumbie | G01F 23/247 |
| 2009/0234596 A1 * | 9/2009 | Kawasaki | F17C 13/028 |
| | | | 702/55 |
| 2009/0299553 A1 * | 12/2009 | Hope | F02K 9/44 |
| | | | 701/13 |
| 2014/0290357 A1 | 10/2014 | Zhang et al. | |

OTHER PUBLICATIONS

Ambrose, "Modeling to Evaluate a Spacecraft Propellant Gauging System", Journal of Spacecraft and Rockets, 2000, pp. 833-836, vol. 37, No. 6.

* cited by examiner

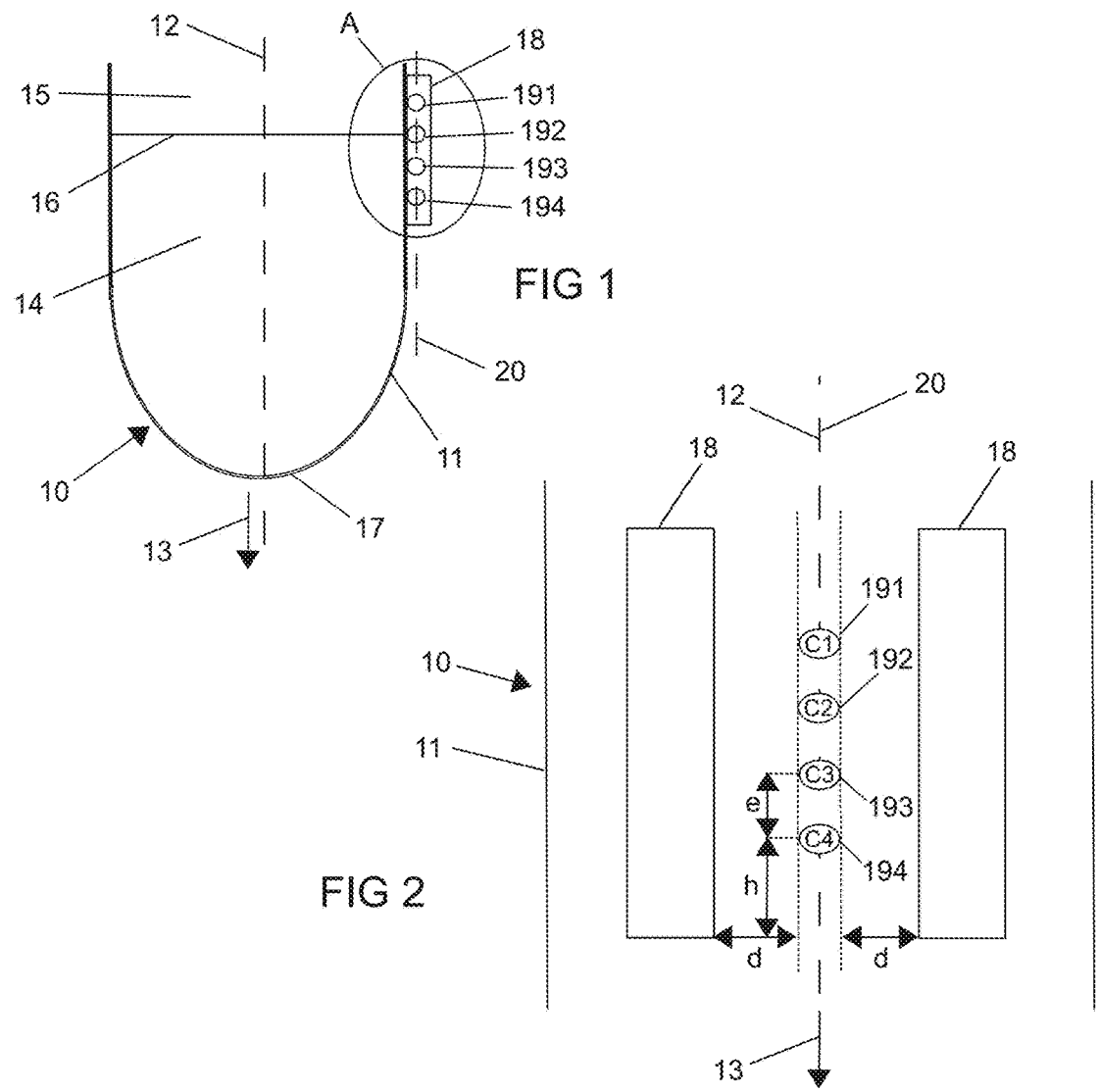
FIG 1
FIG 2
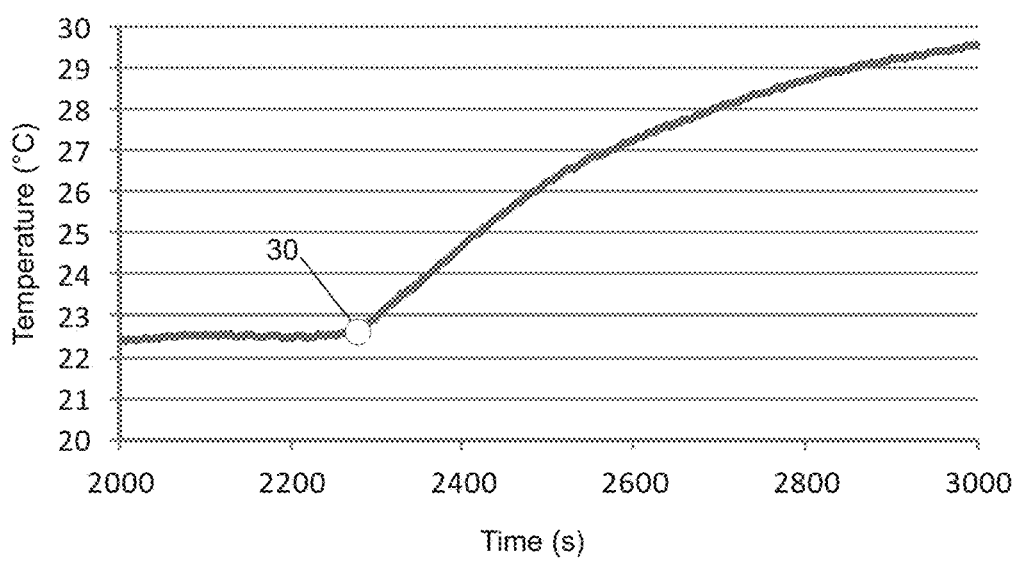
FIG 3

METHOD FOR THERMALLY GAUGING THE TANK OF A SPACECRAFT AND A SPACECRAFT EQUIPPED WITH MEANS FOR IMPLEMENTING SUCH A METHOD

BACKGROUND OF THE INVENTION

Field of the Invention

The present invention relates to the field of gauging propellant tanks of spacecrafts, in particular satellites, in operation.

More particularly, the present invention relates to a method for such a gauging, by thermal localisation of the liquid-gas interface in the tank, as well as to a spacecraft equipped with means for implementing such a gauging method. The invention further relates to a system for gauging the propellant tank of such a spacecraft.

Description of the Related Art

The assessment of the quantity of liquid propellant remaining on-board a satellite in operation is essential as regards the satellite's mission, in particular with respect to telecommunications satellites, the lifetime of which directly depends on the quantity of remaining propellant, and for which this quantity of propellant is one of the main criteria taken into account when determining replacement and relocation strategies.

Such an assessment is also particularly of interest for satellites in low-Earth orbit (LEO), for which a reserve of propellant must be kept in order to allow for a controlled re-entry into the Earth's atmosphere, a lowering of the altitude for re-entry within 25 years, or even for increasing the orbit in order to clear low-Earth orbits so as to comply with space debris reduction measures; or also for satellites on interplanetary missions, for which high-thrust firings, generally exceeding 400 N, are required throughout the mission duration, and for which it is advantageous to know the quantity of propellant remaining in the tank in order to optimise this mission.

Methods commonly used to determine the quantity of liquid propellant remaining in the tank of a satellite in operation include counting the propellant consumed by each thruster (known as "Dead Reckoning") or the so-called PVT method (for "Pressure, Volume, Temperature"). However, the accuracy and reliability of these methods are not satisfactory. In particular, the method of counting the propellant consumed becomes increasingly less reliable as the quantity of liquid propellant in the tank decreases, i.e. at the very time at which the assessment of the remaining quantity becomes the most crucial.

The prior art has also proposed determining the volume of liquid propellant contained in the tank of a satellite by a thermal method, referred to as TPGT (for "Thermal Propellant Gauging Technique") method. This method consists of calculating the inertia of a tank and the content thereof by heating, and of deducing therefrom the mass contained in the tank. However, it can only be applied when the quantity of propellant in the tank is low. Moreover, it is burdensome to implement and requires binding calibration operations upstream of the mission.

The prior art has otherwise proposed assessing the quantity of liquid propellant contained in the tank of a satellite in a zero-gravity environment by using the fact that the thermal inertia of the wall of a thermally-conductive tank differs depending on whether this wall is in contact or not in contact with the liquid contained in the tank. Such prior art, in particular illustrated by documents U.S. Pat. No. 5,209,115 and US 2009/0234596/EP 2 103 863, thus propose placing a heating member and a temperature sensor on the outer surface of the wall of the tank, and determining, under static conditions in a zero-gravity environment, the rate at which the temperature measured by the sensor rises under the effect of heating by the heating member. The rate thus measured is compared with pre-established charts, which allow a corresponding mass of liquid propellant contained in the tank to be deduced. Document U.S. Pat. No. 5,209,115 alternatively proposes comparing the rates of temperature rise obtained by two different temperature sensors, one of which is situated in a location where the tank may contain liquid, and the other in a location where it does not contain liquid.

Such estimation methods are, however, complex to implement, in particular since they require prior calibration operations for each given tank geometry. Moreover, they are not very accurate and require, in order to increase the accuracy thereof, the implementation of tanks and/or measuring devices that comprise a plurality of heating members and temperature sensors, of complex configuration.

SUMMARY OF THE INVENTION

The present invention aims to overcome the drawbacks of the methods for assessing the quantity of liquid propellant present in the tank of a satellite in operation proposed by the prior art, in particular the drawbacks described hereinabove, by proposing a method that allows such an assessment to be carried out in an easy and accurate manner, by means of a simple device that can furthermore be easily adapted to all types of tank, this method moreover not requiring tedious prior calibration operations.

For this purpose, the present inventors propose taking advantage, as is proposed by the prior art, of the significant difference in the thermal inertia of the wall of the tank depending on whether it is in contact with a liquid or with a gas. However, the inventors do not propose doing so when the satellite is in a microgravity environment, as proposed in the prior art, i.e. in a phase in which the satellite is stationed for its mission, and the liquid is static in the tank, distributed against the peripheral wall thereof, but they conversely propose doing so during a phase of high-thrust exerted by the means of propulsion of the satellite, for example during an apogee motor firing. During such a phase of high-thrust, the present inventors have observed that the high acceleration to which the satellite is subjected generates conditions in the tank thereof that can be compared to gravitational conditions, wherein the forces exerted on the liquid under the effect of the acceleration are preponderant with respect to the capillary forces to which the liquid is subjected. Under such conditions, which will hereafter be referred to as "gravitational conditions" for simplicity purposes, the volume of liquid contained in the tank is concentrated in a same part of the tank, and a liquid-gas interface is formed therein, which interface is substantially planar and perpendicular to the thrust axis.

Moreover, whereas the prior art proposes measuring the rate at which the temperature of the wall of the tank rises under stationary conditions wherein no movement is produced in the tank, based on data recorded by a temperature sensor over an extended period of time, this rate then being in particular compared to pre-established charts, or otherwise measuring the temperature of the wall of the tank after an extended heating period, and comparing this with a reference, the present inventors have discovered that a reliable and accurate assessment of the volume of liquid propellant present in the tank can be carried out by implementing a series of instant acquisitions, at a sufficiently fast rate, of the temperature of the wall of the tank at a given point on this wall, during a phase in which the quantity of liquid propellant inside the tank decreases quickly. This advantageously allows, by detecting a sudden change in temperature, to determine the moment at which the liquid-gas interface in the tank reaches this given point, this causing a sudden change in the local thermal inertia of the wall of the tank. The flatness of the liquid-gas interface then allows the moment thus determined to be quickly and easily associated with a specific volume of liquid contained in the tank, regardless of the configuration of the latter.

In other words, in a diagrammatic manner, the present invention thus proposes, in order to gauge the propellant tank of the spacecraft, taking advantage of a phase of high acceleration of the spacecraft to analyse the change in temperature of the wall of the tank induced by the controlled movement of the liquid inside the tank. Very accurate gauging can thus be obtained using simple apparatus that is easy to implement, which is not possible according to the prior art, which proposes nothing more than analysing the temperature change of the wall of the tank induced by the duration of the heating, under stationary conditions.

Thus, according to a first aspect, the present invention relates to a method for gauging the liquid propellant tank of a spacecraft, in particular a satellite, in operation, said liquid propellant tank comprising a thermally-conductive peripheral wall, having a known geometry and containing a volume of liquid propellant, and the spacecraft being equipped with means of propulsion capable of exerting, according to a given thrust axis, a high thrust. The term "high thrust" is understood herein to be a thrust that allows the spacecraft to achieve an acceleration of greater than or equal to $0.05 \text{ m/s}^2$.

This method comprises steps of:
during a phase of high-thrust along the thrust axis exerted by the means of propulsion supplied with liquid propellant from said propellant tank, in particular during an apogee motor firing, remotely controlling the spacecraft, in which are attached, on the outer surface of the wall of the tank, a heating member and at least one temperature sensor in a known position in proximity to said heating member. The term "in proximity to" is understood herein to mean that the temperature sensor is close enough to the heating member to be capable of measuring a rise in the temperature of the wall of the tank caused by the heating of said wall by the heating member. The temperature sensor is furthermore arranged in a plane perpendicular to the thrust axis, referred to as plane of interest, in which the liquid-gas interface in the tank is likely to be located at some time during a phase of high-thrust exerted by the means of propulsion along the thrust axis. More particularly, the spacecraft is controlled remotely in order to implement steps of:
heating the wall of the tank using the heating member;
and acquiring measurements of the temperature of the wall of the tank using the temperature sensor, at an acquisition rate of one measurement every 30 seconds or less, preferably of one measurement every 10 seconds or less;
determining the moment I at which the temperature measured by the temperature sensor changes, which corresponds to the moment at which a break of slope occurs on a digital curve representing the temperature recorded by the temperature sensor as a function of time, such a change indicating the presence in the plane of interest of the liquid-gas interface in the tank;
and determining, from the tank's geometrical data and the known position of the temperature sensor on the wall of the tank, the volume of liquid propellant present in the tank at the moment I.

From this volume it can be easily determined the corresponding mass of liquid propellant, according to a calculation that is in itself conventional for a person skilled in the art, using the known density of the liquid.

The method according to the invention thus allows for the accurate determination of the quantity of liquid propellant contained in the tank of the spacecraft by determining the exact moment at which the liquid-gas interface is located at a given height in the tank during a phase of high acceleration generating gravitational conditions in the tank.

This determination is advantageously easy to carry out and does not require burdensome prior calibration operations; it may be carried out by means of physically simple, inexpensive equipment that is easy to integrate into all types and configurations of existing tanks.

As opposed to the so-called TPGT method for example, the method according to the invention can further be applied in a reliable manner even when the quantity of propellant contained in the tank is high. It can in particular be easily adapted to any level of tank filling, for the tank the gauging of which is of interest for the mission.

Thus, by placing the temperature sensor in an area of the tank that is adapted to the satellite's mission, the estimation carried out according to the invention of the moment at which a determined level of liquid propellant, corresponding to this position of the temperature sensor, is reached in the tank, makes it advantageously possible to easily and accurately assess the mass of liquid propellant available at the end of the phase of high-thrust, and the remaining duration for the satellite's mission at the end of this phase, in particular by combining the data obtained by the method according to the invention with the data derived from the so-called Dead Reckoning method for estimating the consumption of the means of propulsion during the phase of high-thrust, and the duration of said phase.

For this purpose, the following equation (1) can, for example, be applied:

$$m_{BOL}=m_{TM}-(t_{finLAE}-t_{TM})*\dot{m}_{LAE} \quad (1)$$

wherein:
$m_{BOL}$ represents the mass of propellant at the end of the phase of high-thrust (corresponding to the start of the satellite's mission)
$m_{TM}$ represents the mass of liquid propellant determined using the method according to the invention
$t_{finLAE}$ represents the duration of the phase of high-thrust
$t_{TM}$ represents the moment I at which the liquid-gas interface in the tank reaches the position of the temperature sensor, determined by the method according to the invention
and $\dot{m}_{LAE}$ represents the theoretical variation per unit of time of the mass of liquid propellant during the phase of high-thrust.

Since it allows the quantity of liquid propellant contained in the tank of a satellite at the end of an apogee motor firing to be accurately gauged, the method according to the invention advantageously makes it possible to: accurately determine which manoeuvres are still possible for the satellite at the end of this apogee motor firing; reduce the on-board propellant budget, by reducing the quantity of propellant to be carried in order to overcome the uncertainty associated with existing gauging methods and to guarantee completion of the satellite's mission; optimising the operating duration of the satellite; improve knowledge of the drop zone in the case of a controlled re-entry with propellant depletion during the last apogee motor firing, etc.

The method according to the invention is also particularly suitable for taking into account the changes of international regulations regarding the requirement to de-orbit satellites. In particular, as regards satellites in low-Earth orbit, the method according to the invention allows the contents of the tank to be accurately gauged during and/or at the end of the first de-orbit phases.

The method according to the invention is also particularly useful for maximally extending the service life of satellites on an interplanetary mission, as well as of Earth observation satellites, for which a controlled re-entry is planned at the end of the mission.

The term "thermally-conductive wall" is understood herein to mean that the peripheral wall of the tank has, at least in a given area, a thermal conductivity that is at least equal to 5 $W \cdot m^{-1} \cdot K^{-1}$.

The method according to the invention can comprise a prior step of attaching the heating member (or optionally the heating members) and the temperature sensor(s) on the outer surface of the wall of the tank, in a suitable position according to the needs of the mission. Alternatively, it can comprise a step of getting a spacecraft already equipped as such.

Preferentially, the phase of acquiring measurements of the temperature of the wall of the tank using the temperature sensor is initiated at least one minute after the start of the phase of high-thrust using the means of propulsion of the spacecraft. Such an offset in time advantageously improves the accuracy and reliability of the method according to the invention. Indeed, transient phenomena occur in the tank of the spacecraft at the start of the phase of high-thrust, in particular resulting from sloshing to which the tank is subjected. The time after which such transient phenomena disappear depends on various parameters, in particular the size of the tank. A person skilled in the art is capable of determining, according to these parameters, the optimum time to begin acquiring the temperature measurements in order to optimise the accuracy of the gauging method according to the invention. For example, the acquisition of the temperature measurements can be started after at least 10 minutes of an acceleration of the spacecraft greater than or equal to 0.05 $m/s^2$.

The acquisitions of the measurements of the temperature of the wall of the tank using the temperature sensor are moreover preferably carried out at a sufficiently fast acquisition rate in order to determine, with a high degree of accuracy, the moment at which the liquid-gas interface in the tank is located in the plane of interest associated with the temperature sensor. Again, a person skilled in the art is capable of determining this optimum acquisition rate, according to the specific parameters of the spacecraft, and in particular the dimensions of the tank and the consumption of the means of propulsion.

By way of example, the acquisitions of the temperature measurements can be carried out at a rate of one measurement every 5 seconds or less, for example at a rate of one measurement every 4 seconds.

The method according to the invention can further comprise one or more of the features described hereinbelow, which may be implemented by their own or according to any combinations technically possible.

As stated hereinabove, the moment I at which the temperature measured by the temperature sensor changes corresponds to the moment at which, if a digital curve is produced representing the temperature recorded by the temperature sensor as a function of time, a sudden break of slope occurs on this digital curve. In other words, this moment I corresponds to the moment at which the difference between two values successively recorded by the temperature sensor, which was substantially constant until said moment, suddenly varies in a more significant manner.

According to specific embodiments of the invention, the determination of the moment I at which the temperature measured by the temperature sensor changes is carried out by detecting the moment at which a break of slope occurs on a digital curve representing the temperature recorded by the temperature sensor as a function of time.

For this purpose, any digital method conventional in itself to a person skilled in the art can be implemented for detecting a break of slope on a curve. This method can in particular consist of analysing the temperature derivative with respect to time, in a manner known to a person skilled in the art.

According to particularly advantageous embodiments of the gauging method according to the invention, in the spacecraft, a plurality of temperature sensors are attached on the outer surface of the wall of the tank, each of said temperature sensors being arranged in proximity to the heating member and in a plane perpendicular to the thrust axis, referred to as the plane of interest associated with said temperature sensor, in which the liquid-gas interface in the tank is likely to be located at some time during a phase of high-thrust exerted by the means of propulsion along the thrust axis. The method thus comprises, for at least one of the temperature sensors, preferably for a plurality of the temperature sensors and more preferably for each of the temperature sensors, steps of:

determining the moment I at which the temperature measured by the temperature sensor changes, which corresponds to the moment at which a break of slope occurs on a digital curve representing the temperature recorded by said temperature sensor as a function of time, said change indicating the presence of the liquid-gas interface in the plane of interest associated with said temperature sensor. This step in particular comprises remotely controlling the spacecraft in order to carry out a series of instant acquisitions of measurements of the temperature of the wall of the tank using the temperature sensor, at an acquisition rate of one measurement every 30 seconds or less, preferably of one measurement every 10 seconds or less and, for example, of one measurement every 5 seconds or less;

and determining, from the tank's geometrical data and the known position of said temperature sensor on the wall of the tank, the volume of liquid propellant present in the tank at the moment I.

According to specific embodiments of the method according to the invention, in the spacecraft, the temperature sensors are aligned along a so-called measurement axis, which does not lie in a plane parallel to the plane of the liquid-gas interface in the tank during the phase of high-thrust. The measurement axis is preferably parallel to the thrust axis.

The temperature sensors are furthermore preferably situated such that they are equally spaced from the heating member, which also preferably extends along an axis parallel to the thrust axis.

Preferentially, the temperature sensors and the heating member are arranged relative to one another such that the heating of the wall of the tank by the heating member is sensed in the same manner by all of the temperature sensors, under identical conditions of presence or absence of liquid in the plane of interest associated with each of said sensors.

Thus, preferentially, the heating member has a height, measured along an axis parallel to the measurement axis, that is greater than the height occupied by the temperature sensors along the measurement axis.

Preferably, the distance between the adjacent temperature sensors along the measurement axis is furthermore even, and the height of the heating member protruding beyond each of the end temperature sensors is greater than this distance, for example at least 1.5 times greater. Such a feature in particular advantageously allows to avoid any edge effect at the end temperature sensors.

According to specific embodiments of the method according to the invention, in the spacecraft, the distance between two adjacent temperature sensors along the measurement axis, measured along an axis parallel to the thrust axis, is between 10 and 50 mm, for example between 20 and 40 mm.

In such a configuration implementing a plurality of temperature sensors, the determination of the moment I at which the temperature measured by one of the temperature sensors changes can be carried out, as described hereinabove, by detecting the moment at which a sudden break of slope occurs on a digital curve representing the temperature recorded by said temperature sensor as a function of time.

Such a method can be applied simultaneously for a plurality of the temperature sensors. It is preferentially carried out for each of the temperature sensors concerned by the mission, i.e. arranged in an area of the tank in which the liquid-gas interface in the tank is likely be located during the specific mission.

According to specific embodiments of the invention, determining the moment I at which the temperature measured by a first of the temperature sensors changes is carried out by:

for said first temperature sensor and for a temperature sensor arranged upstream of said first temperature sensor in the direction of the thrust exerted by the means of propulsion along the thrust axis, preferably adjacent to said first temperature sensor, remotely controlling the spacecraft in order to carry out simultaneous acquisitions of measurements of the temperature of the wall of the tank, at an acquisition rate of one measurement every 30 seconds or less, preferably of one measurement every 10 seconds or less and, for example, of one measurement every 5 seconds or less, for each pair of simultaneous acquisitions, determining the difference between the temperature measured by said temperature sensor upstream of said first sensor and the temperature measured by said first sensor, and determining the moment at which this difference is at its maximum.

This moment corresponds to the moment I at which the liquid-gas interface in the tank is located in the plane of interest associated with said first sensor. It further corresponds to the moment at which a break of slope occurs on a digital curve representing the temperature recorded by the temperature sensor as a function of time.

Such an embodiment of the method according to the invention allows for a particularly reliable and accurate gauging of the tank.

In particular, the present inventors have observed that, during the heating of the wall of the tank using the heating member, a cold area is formed at the wall of the tank, immediately below the free liquid surface, whereas the area situated above this free surface heats up over time. The temperature difference between the first temperature sensor and the temperature sensor arranged upstream of said first sensor, is thus at its maximum when the free liquid surface is located immediately above the first sensor. Then, whereas the level of liquid continues to fall in the tank, the temperature of the first temperature sensor increases more quickly than that of the temperature sensor situated upstream thereof.

In the spacecraft implemented according to the invention, the heating member can be of any type that is conventional in itself to a person skilled in the art. It is preferably of the electrical resistor type, the power output whereof can in particular lie in the range of 1 to 10 W. It is powered by an electrical power source arranged in the spacecraft.

According to specific embodiments of the method according to the invention, in the spacecraft, two heating members are attached to the outer surface of the wall of the tank, on either side of the one or more temperature sensors and at an equal distance from the one or more temperature sensors. The second heating member is preferably substantially identical to the first heating member, and arranged in a substantially similar manner relative to the temperature sensors.

The activation of the heating member, for heating the wall of the tank, by remotely controlling the spacecraft, can take place either before or after the start of the phase of high-thrust.

In the spacecraft implemented according to the invention, the temperature sensors can also be of any conventional type in itself. They can, for example, consist of thermistors or thermocouples.

According to the invention, in the spacecraft, the distance between the temperature sensor and the heating member can be chosen differently according to the features of the apparatus implemented, in particular the thermal conductivity of the wall of the tank, the power output of the heating member and the sensitivity of the temperature sensor. A person skilled in the art is capable of determining the optimum distance according to these features, for example using digital simulations. By way of example, this distance can lie in the range 2 to 30 mm.

According to the acceleration to which the spacecraft is subjected, the liquid surface in the tank can take on a curved shape, referred to as a meniscus.

The expression "determining the moment I at which the temperature measured by said temperature sensor changes, such a change indicating the presence in the plane of interest of the liquid-gas interface in the tank" includes, according to the present invention, cases wherein the temperature change measured by the temperature sensor is indicative of the presence, in the plane of interest, of an edge of the meniscus situated at the wall of the tank. A person skilled in the art is capable of determining, according to the specific operating conditions, in particular the acceleration undergone by the spacecraft, the known geometrical data for the tank, and the viscosity of the liquid propellant contained therein, for example using digital simulations for determining the volume corresponding to the difference in the height of the liquid owing to the presence of the meniscus, the actual volume of liquid propellant contained in the tank at the moment I.

The spacecraft can be remotely controlled by a control device, in particular on the ground, whereby control signals are successively determined and sent to the spacecraft by the control device in order to carry out the steps of heating the wall of the tank using the one or more heating members and of acquiring measurements of the temperature of the wall of the tank using the one or more temperature sensors.

Another aspect of the invention thus relates to a control device comprising means designed to control, preferably to remotely control, in particular from the Earth's surface, a spacecraft as described hereinabove, by transmitting successive control signals to said spacecraft, in order to carry out the steps of the method according to the invention for gauging the liquid propellant tank of said spacecraft, which steps are implemented in said spacecraft.

This control device, in particular for control from the ground, is conventional in itself and can comprise one or more antennae for emitting instruction signals to the spacecraft, and for receiving signals therefrom. It can comprise computers and means for processing and storing data received from the spacecraft. The latter is preferably in particular equipped with a control module, in particular comprising one or more processors, slaved to a communication module cooperating with the control device.

The one or more heating members and the one or more temperature sensors are furthermore connected to receivers forming a part of the telemetry of the spacecraft, in order to be able to transmit to them control signals received from the remote control device.

Moreover, in the method according to the invention for gauging the liquid propellant tank of a spacecraft, the processing of the measurements recorded by the temperature sensors is preferentially carried out from a remote station, for example a ground station. For this purpose, the temperature sensors can be connected to a transmitter forming a part of the telemetry of the spacecraft, which is capable of sending a telemetry signal to a receiver situated in the remote station. This receiver preferably forms a part of the control device described hereinabove. It is connected to computing means for processing the temperature data transmitted by the transmitter.

Alternatively, the measurements can be processed on-board the spacecraft, which is thus provided with computing means suitable for fulfilling this purpose. In such a configuration, the gauging method according to the invention comprises a step of remotely controlling, in particular from the ground, these computing means in order to carry out the steps of the method according to the invention, of determining the moment I at which the temperature measured by the temperature sensor changes, and, where necessary, of determining, from the tank's geometrical data and the known position of the temperature sensor on the wall of the tank, the volume of liquid propellant present in the tank at the moment I.

According to another feature, the present invention relates to a spacecraft, equipped with means for implementing a method according to the invention.

This spacecraft comprises:

a propellant tank comprising a thermally-conductive peripheral wall and having a known geometry, containing a volume of liquid propellant, means of propulsion capable of exerting, accordingly to a given thrust axis, a high thrust, i.e. as described hereinabove, a thrust allowing the spacecraft to achieve an acceleration of greater than or equal to $0.05$ m/s$^2$, and supplied with liquid propellant from said propellant tank, and a heating member attached on the outer surface of the wall of the tank.

The spacecraft according to the invention further comprises at least two temperature sensors attached on the outer surface of the wall of the tank, in proximity to the heating member, these temperature sensors being aligned along an axis parallel to the thrust axis, and each being arranged in a plane perpendicular to the thrust axis, referred to as the plane of interest associated with said temperature sensor, in which the liquid-gas interface in the tank is likely to be located at some time during a phase of high-thrust exerted by the means of propulsion of the spacecraft along the thrust axis.

The heating member and the temperature sensors can meet one or more of the features stipulated hereinabove with reference to the gauging method, both as regards the features specific thereto, and the features as regards the arrangement thereof relative to one another on the wall of the tank. They advantageously jointly form a compact system that is easy to position on the wall of the tank of the spacecraft.

Thus, in specific embodiments of the invention, the temperature sensors are situated at an equal distance from the heating member.

The heating member preferably has a height, measured along an axis parallel to the thrust axis, that is greater than the height occupied by the temperature sensors along the measurement axis.

Preferentially, the distance between the adjacent temperature sensors arranged along the measurement axis is even, and the height of the heating member protruding beyond each of the end temperature sensors is greater than this distance.

The distance between two adjacent temperature sensors arranged along the measurement axis can in particular lie in the range 10 to 50 mm, for example in the range 20 to 40 mm.

According to specific embodiments of the invention, two heating members are attached on the outer surface of the wall of the tank, on either side of the temperature sensors and at an equal distance from the temperature sensors. The second heating member is preferably substantially identical to the first heating member, and arranged in a similar manner relative to the temperature sensors.

According to specific embodiments of the invention, the spacecraft further comprises telemetry means suitable for transmitting the temperature values recorded by the temperature sensors to a remote receiver. These telemetry means are of a type that is conventional to a person skilled in the art.

It further comprises one or more receivers for receiving control signals, in particular originating from a remote control device, in order to carry out the steps of the gauging method according to the invention that are implemented in the spacecraft.

According to another aspect, the invention relates to a system for gauging the propellant tank of a spacecraft according to the invention, said spacecraft having one or more of the features described hereinabove or hereinbelow. This gauging system comprises:

said spacecraft, optionally, a device for remotely controlling the spacecraft in order to carry out the steps of the gauging method according to the invention implemented on-board the spacecraft, and computing means for determining, from the temperature values recorded by at least one of the temperature sensors, the moment I at which the liquid-gas interface in the tank is located in the plane of interest associated with the temperature sensor, and the associated volume of liquid propellant present in the tank.

According to specific embodiments of the invention, the spacecraft comprises telemetry means suitable for transmitting the temperature values recorded by the temperature sensors to a remote receiver. The gauging system further comprises a receiver capable of receiving the temperature values transmitted by the telemetry means of the spacecraft, and of transferring them to the computing means.

The telemetry means, the receiver and the computing means are conventional in themselves.

The computing means can comprise means for processing and storing data received from the spacecraft. They can, for example, comprise at least one processor and at least one electronic memory in which a computer program product is stored, in the form of a set of program code instructions to be executed in order to implement the different computing steps of the gauging method according to the invention. In one alternative embodiment of the invention, the computing means further comprise one or more programmable logic devices of the FPGA, PLD type, etc., and/or application-specific integrated circuits (ASIC) suitable for implementing all or part of said computing steps of the gauging method according to the invention. In other words, the computing means comprise a set of means designed as a software (specific computer program product) and/or hardware (FPGA, PLD, ASIC, etc.) to implement the different computing steps of the gauging method according to the invention.

Generally-speaking, according to another aspect, the present invention relates to a computer program product, which comprises a set of program code instructions which, when executed by a processor, implement all of the steps of a method for gauging the liquid propellant tank of a spacecraft according to the invention.

BRIEF DESCRIPTION OF THE DRAWINGS

The features and advantages of the invention will be better understood upon reading the description of the example embodiments provided hereafter for illustrative purposes only and in no way limiting the scope of the invention, with reference to FIGS. 1 to 7, wherein:

FIG. 1 shows a diagrammatic view of the propellant tank of a spacecraft equipped with a heating member and a set of temperature sensors for implementing a gauging method according to the invention;

FIG. 2 shows a set of heating members and temperature sensors, equipping the propellant tank of a spacecraft for implementing a gauging method according to the invention;

FIG. 3 shows a graph illustrating the change, as a function of time, in the temperature recorded by a temperature sensor of FIG. 2, during the implementation of a gauging method according to the invention;

DESCRIPTION OF THE PREFERRED EMBODIMENTS

Figure 4:
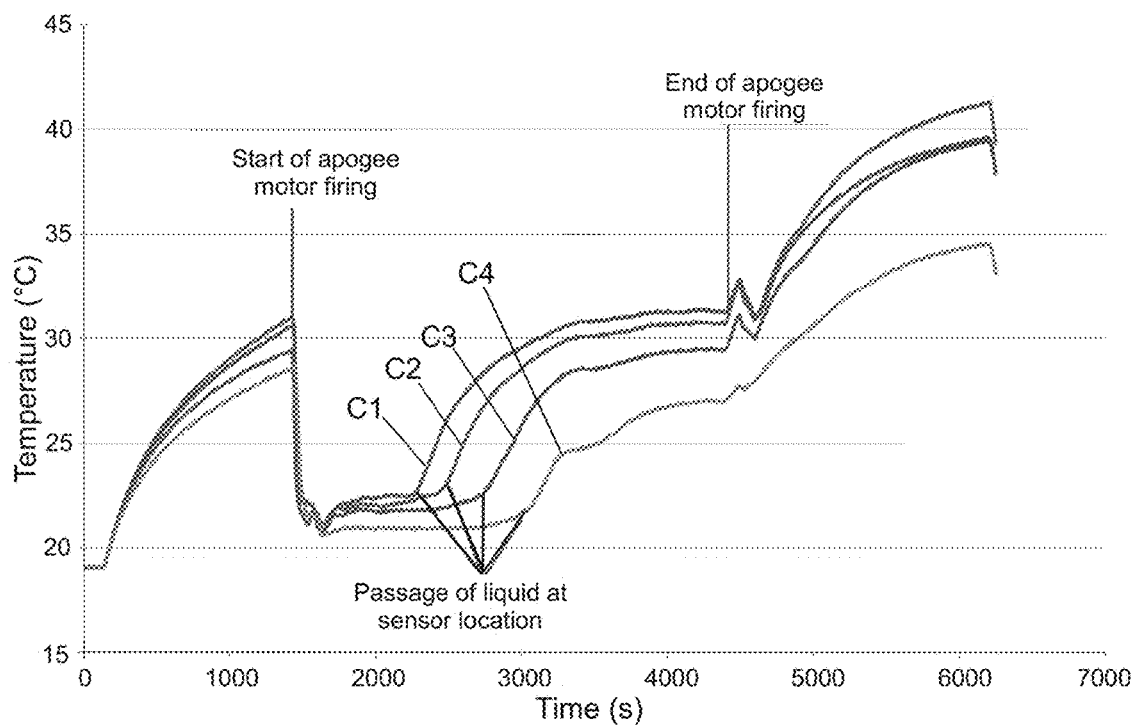
FIG. 4 shows a graph illustrating the change, as a function of time, in the temperatures recorded by all of the temperature sensors of FIG. 2, during the implementation of a gauging method according to the invention during an apogee motor firing.

It should be noted straight away that the drawings are not to scale, and that some elements and some distances have been purposefully enlarged in order to facilitate the understanding of the invention.

The method for gauging the propellant tank of a spacecraft, such as a satellite, this tank containing a volume of liquid propellant, is intended to be implemented for a spacecraft equipped with means of propulsion capable of exerting a high thrust along a given thrust axis 12, i.e. so as to apply an acceleration of greater than or equal to 0.05 m/s² to the spacecraft. Typically, such a thrust is implemented during apogee motor firings with the purpose of bringing the telecommunications satellite from the orbit into which it was injected by the launch vehicle into the mission geostationary orbit thereof.

The means of propulsion of the spacecraft can be of a type conventional in itself, operating by consumption of liquid fuel.

One example of a tank 10 of a spacecraft to which the present invention applies is shown in FIG. 1. This tank is externally delimited by a wall 11 made of a thermally-conductive material, for example titanium or aluminium, preferably having a thermal conductivity of greater than or equal to 5 W·m$^{-1}$·K$^{-1}$. For example, the wall 11 can have a thickness of 1 mm, with a thermal conductivity of 5 W·m$^{-1}$·K$^{-1}$.

The tank 10 has a known geometry, this geometry of course not being limited to the specific shape shown in FIG. 1.

FIG. 1 shows the thrust axis 12. The high thrust exerted by the means of propulsion of the spacecraft is exerted along this axis 12, in the direction given the reference numeral 13 in this figure.

The tank 10 contains a volume of liquid propellant 14 and a volume of gas 15.

During a phase of high-thrust exerted by the means of propulsion of the satellite along the thrust axis 12, and in the direction 13, consuming liquid propellant, the volume of liquid propellant 14 is pressed against the bottom 17 of the tank. The liquid-gas interface 16 in the tank 10 is planar and substantially perpendicular to the thrust axis 12, in this case perpendicular to the plane of FIG. 1, and it moves substantially perpendicularly to the thrust axis 12, and in the direction 13, towards the bottom 17 of the tank. During this displacement, the liquid-gas interface 16 is thus successively located in a plurality of planes perpendicular to the thrust axis 12.

The method according to the invention implements at least one heating member 18, which is attached on the outer surface of the wall 11 of the tank, such that it is capable of heating said wall 11. Said heating member 18 can be of any type conventional in itself, in particular of the electrical resistor type. It preferentially has a power output that lies in the range 1 to 10 W.

The heating member 18 is preferably attached to the wall 11 of the tank 10 such that it extends over a certain height thereof, this height being measured parallel to the thrust axis 12, and such that it covers a plurality of the planes in which the liquid-gas interface 16 in the tank 10 is likely to be located at some point during an operating phase of the spacecraft, during which the means of propulsion exert a high thrust, for example during an apogee motor firing.

The heating member 18 is associated with at least one temperature sensor 191, for example a thermistor, which is itself also attached to the outer surface of the wall 11 of the tank 10, in the vicinity of the heating member 18. In the embodiment shown in FIG. 1, a plurality of such temperature sensors, more specifically four temperature sensors 191, 192, 193, 194 (such a number in no way limiting the scope of the invention), are thus associated with the heating member 18. These temperature sensors 191, 192, 193, 194 are aligned along a so-called measurement axis 20. This measurement axis is preferably substantially parallel to the thrust axis 12.

Each temperature sensor 191, 192, 193, 194 is arranged close enough to the heating member to be capable of measuring a rise in the temperature of the wall 11 of the tank 10 caused by the heating of said wall 11 by the heating member 18. Each temperature sensor is furthermore arranged in a plane perpendicular to the thrust axis 12, referred to as the plane of interest associated with the temperature sensor, in which the liquid-gas interface 16 in the tank 10 is likely to be situated momentarily during the phase of high-thrust, as the volume of liquid propellant 14 contained in the tank 10 lowers.

The known geometric data of the tank 10 can thus be used to associate, by easy calculation, each temperature sensor 191, 192, 193, 194 with a volume of liquid corresponding to the volume of liquid propellant 14 remaining in the tank 10 when the free liquid surface, i.e. the liquid-gas interface 1, is located in the plane of interest associated with the temperature sensor.

This volume can be easily converted into the mass of liquid propellant remaining in the tank 10, using the known density of the liquid propellant used.

FIG. 2 shows a front view of one example arrangement of the different elements attached to the wall 11 of the tank 10 for implementing a gauging method according to the invention. Thus, in this figure, the wall 11 of the tank 10 extends in the plane of the figure.

In this example embodiment, two heating members 18 are implemented, which heating members can be identical or different from one another, and preferably extend substantially parallel to one another, preferentially along an axis that is substantially parallel to the thrust axis 12.

Four temperature sensors successively called C1, C2, C3 and C4, respectively having the reference numerals 191, 192, 193, 194 in the order beginning with the temperature sensor located the furthest from the bottom 17 of the tank 10, to the temperature sensor located the closest to said bottom 17, are arranged between the two heating members 18. These temperature sensors can be identical or different from one another.

The temperature sensors 191, 192, 193, 194 are all situated at an equal distance from each heating member 18. This distance, denoted as d, is for example equal to 5 mm.

The temperature sensors 191, 192, 193, 194 are aligned along a so-called measurement axis 20, which does not lie in a plane parallel to the plane of the liquid-gas interface in the tank 10 during a phase of high-thrust exerted by the means of propulsion of the spacecraft along the thrust axis 12. Preferably, the measurement axis 20 is substantially parallel to the thrust axis 12. In the specific view shown in FIG. 2, the thrust axis 12 and the measurement axis 20 are superimposed on one another.

The distance between two temperature sensors 191, 192, 193, 194 adjacent along the measurement axis 20 measured along the thrust axis 12, denoted as e, is preferentially even, and is preferably of between 10 and 50 mm. It is, for example, equal to 25 mm.

The height of each heating member 18, measured along the measurement axis 20, projecting beyond each of the end temperature sensors 191, 194, denoted as h, is preferably greater than the distance e between two adjacent temperature sensors 191, 192, 193, 194, in particular 1.5 times greater. Thus, the edge effects that could occur at the end temperature sensors 191, 194 are advantageously avoided. By way of example, the height of the heating members 18 projecting beyond each of the end temperature sensors 191, 194 can be equal to 37.5 mm.

These different elements can be arranged in any relevant area of the tank 10 as a function of the needs of the mission of the spacecraft. They can, for example, be arranged near the diaphragm conventionally equipping the tank 10.

According to one specific example embodiment, the method for gauging the tank 10 according to the invention, using the elements described with reference to FIG. 2, is carried out as follows.

In the full description hereinbelow, the quantified results are provided for the following operational configuration: the distance e between two adjacent temperature sensors is 25 mm; the heating member projects beyond the end temperature sensors 191, 194 by a height h of 37.5 cm; the distance d between the temperature sensors 191, 192, 193, 194 and the heating members 18 is equal to 5 mm. Each heating member 18 has a power output of 1.5 W.

During an apogee motor firing, i.e. a phase of high-thrust exerted along the thrust axis 12 by the means of propulsion of the spacecraft, more specifically, for the quantified examples provided hereafter, a phase of thrust allowing the spacecraft to undergo an acceleration of 0.117 m/s$^2$, creating gravity conditions in the tank, this phase lasting for 2,818 s, the wall 11 of the tank 10 is heated by the heating members 18.

The heating members 18 can also be activated either before implementing the phase of high-thrust or during this phase.

The completion of this step, as for the other steps implemented in the spacecraft, one example embodiment of which will be described hereafter, is controlled remotely by a control device situated remotely therefrom, for example on the Earth's surface.

This remote control device is configured such that it controls the different steps of the method implemented by the spacecraft. For this purpose, the control device and the spacecraft each comprise conventional remote communication means.

The control device is suitable for determining control signals that are sent to the spacecraft. These control signals are, for example, determined as a function of measurement signals received from the spacecraft, which are determined by different sensors (gyroscope, star sensor, etc.) thereof.

According to the invention, for at least one of the temperature sensors 191, 192, 193, 194, preferably for a plurality and preferentially for all of these temperature sensors, a series of instant acquisitions is then carried out, at a fast rate, of the temperature of the wall 11 of the tank 10. In the quantified examples presented herein, the acquisitions are carried out at a rate of one acquisition every 4 seconds. They are preferably simultaneously carried out for all temperature sensors 191, 192, 193, 194.

The data recorded by the temperature sensors 191, 192, 193, 194 is preferably transmitted, by the telemetry means of the spacecraft, to the remote control device, in particular situated on the Earth's surface. This device preferably comprises computing means configured such that they can implement the different computing steps of the gauging method according to the invention.

The remote control device comprises, for example, at least one processor and at least one electronic memory in which a computer program product is stored, in the form of a set of program code instructions to be executed in order to implement the different steps of a gauging method according to the invention.

In one alternative embodiment, the control device further comprises one or more programmable logic devices of the FPGA, PLD type, etc., and/or application-specific integrated circuits (ASIC) suitable for implementing all or part of said steps of the gauging method. In other words, the control device comprises a set of means designed as software (specific computer program product) and/or hardware (FPGA, PLD, ASIC, etc.) to implement the different steps of a method for gauging the liquid propellant tank of a spacecraft according to the invention.

During the phase of high-thrust, a high quantity of liquid propellant is consumed by the means of propulsion, so much so that the volume of liquid propellant 14 in the tank falls quickly. As described hereinabove, the liquid propellant is pressed towards the bottom 17 of the tank 10, and the free surface of the liquid 16 is planar, and substantially perpendicular to the thrust axis 12.

For each temperature sensor, when the liquid-gas interface 16 is located in the plane of interest associated with the sensor, a sudden increase occurs in the temperature measured. The thermal inertia of the wall 11 of the tank 10 indeed differs depending on whether liquid is or is not in contact with said wall 11.

On a digital curve representing the temperature recorded by the temperature sensor as a function of time, as shown in FIG. 3, for example for the temperature sensor C1 191, a break of slope occurs, indicated by the circle given the reference numeral 30 in this figure.

FIG. 4 shows a graph illustrating the change, as a function of time, of the temperature recorded by each of the temperature sensors C1 191, C2 192, C3 193 and C4 194.

This graph shows the start of the apogee motor firing and the end of the apogee motor firing. The heating members 18 are in operation throughout all the duration of the apogee motor firing. They have been activated prior to the start of the firing.

As can be seen on the curves, at the time of the start of the apogee motor firing, the temperature of the wall 11 of the tank situated at the location of the temperature sensors falls rapidly. Indeed, the liquid propellant has been pressed towards the bottom 17 of the tank 10, and fully occupies the part of the tank in which the temperature sensors are situated. The thermal inertia of the wall 11 at this location is thus high. During the apogee motor firing, a sudden break of slope is successively seen on each of the curves. Each sudden break of slope indicates the moment at which the liquid-gas interface 16 in the tank 10 is located in the plane of interest associated with a temperature sensor 191, 192, 193, 194. Logically, this interface is firstly located in the plane of interest associated with the temperature sensor C1 191 situated the furthest from the bottom 17 of the tank 10, then in the plane of interest associated with the temperature sensor C2 192 immediately adjacent thereto, then in the plane of interest associated with the following temperature sensor C3 193, and finally in the plane of interest associated with the temperature sensor C4 194 situated the closest to the bottom 17 of the tank 10.

The gauging method according to the invention comprises a step of determining the moment at which the temperature recorded by one of the temperature sensors 191, 192, 193, 194 changes.

This moment can be determined by analysing the difference between the temperatures recorded by two temperature sensors associated with separate planes of interest, which advantageously allows a particularly reliable and accurate result to be obtained. More particularly, the moment at which the temperature recorded by a temperature sensor, for example the sensor C2 192, changes can be determined by analysing the difference between the temperature recorded by this sensor C2 192 and the temperature recorded by a temperature sensor situated upstream in the direction of thrust 13, i.e. a temperature sensor situated further from the bottom 17 of the tank 10 than the temperature sensor C2 192, which is preferably adjacent thereto. In the specific embodiment shown in the figures, this is the adjacent sensor C1 191. Indeed, at the wall 11 of the tank 10, a cold area forms immediately below the liquid-gas interface 1, and a hot area, which becomes increasingly hotter over time, forms above this interface.

Figure 5:
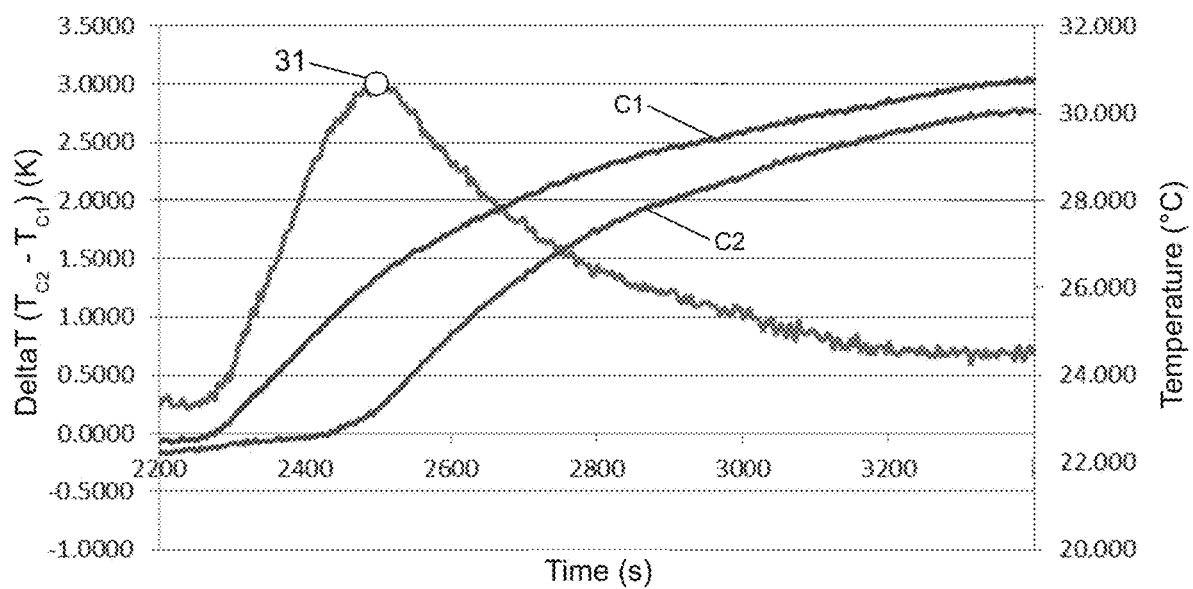
FIG. 5 shows a graph illustrating the change, as a function of time, in the temperatures recorded by two adjacent temperature sensors in FIG. 2, as well as the difference between the temperatures recorded by these two sensors, during the implementation of a gauging method according to the invention.

FIG. 5 shows a graph representing, as a function of time, the change in the temperature recorded by the temperature sensor C1 191, in the temperature recorded by the temperature sensor C2 192, and in the difference between these two temperatures. The moment at which this difference is at the highest, which is shown by a circle given the reference numeral 31 in this figure, corresponds to the moment at which the thermal inertia of the wall 11 of the tank 10 begins to change at the location of the temperature sensor C2 192, which means that the liquid-gas interface 16 in the tank 10 is located at the level of this sensor. Then, the temperature difference begins to decrease, the two sensors are both located in an area of the wall 11 of the tank 10 that is no longer in contact with the liquid.

Thus, by studying the temperature differences recorded by two separate temperature sensors, the moment I can advantageously be accurately determined, at which moment the liquid-gas interface 16 in the tank is located in the plane of interest associated with the temperature sensor which, among these two temperature sensors, is situated the closest to the bottom 17 of the tank 10.

Figure 6:
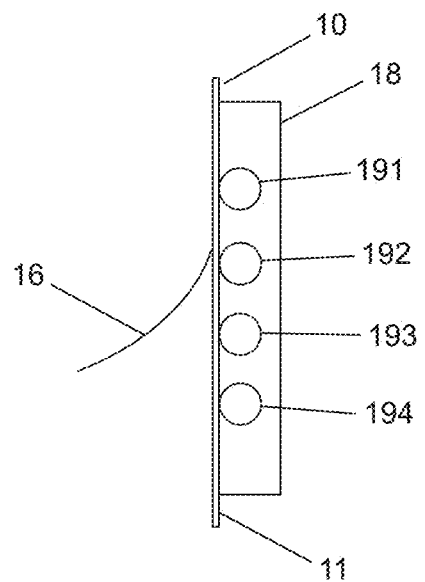
FIG. 6 shows an expanded view of the area A in FIG. 1, showing the meniscus shape of the liquid surface in the tank.

As a function of the acceleration to which the spacecraft is subjected, the liquid-gas interface 16 in the tank 10 can take on a curved shape, referred to as a meniscus, the level of liquid being higher against the wall 11 of the tank 10 than at the centre thereof. This meniscus shape is classically all the more pronounced as the acceleration of the spacecraft is low. This meniscus shape is shown in FIG. 6, which provides an expanded view of the area A of FIG. 1.

The change in thermal inertia of the wall of the reactor does not occur exactly at the free liquid surface, but slightly higher, at the peripheral edge of the meniscus.

A person skilled in the art is capable of determining, as a function of the specific conditions, the height of this meniscus, and of providing, according to this height, the adequate correction to the volume of propellant actually contained in the tank at the moment I determined according to the invention, in order to improve the accuracy of the gauging method according to the invention.

Figure 7:
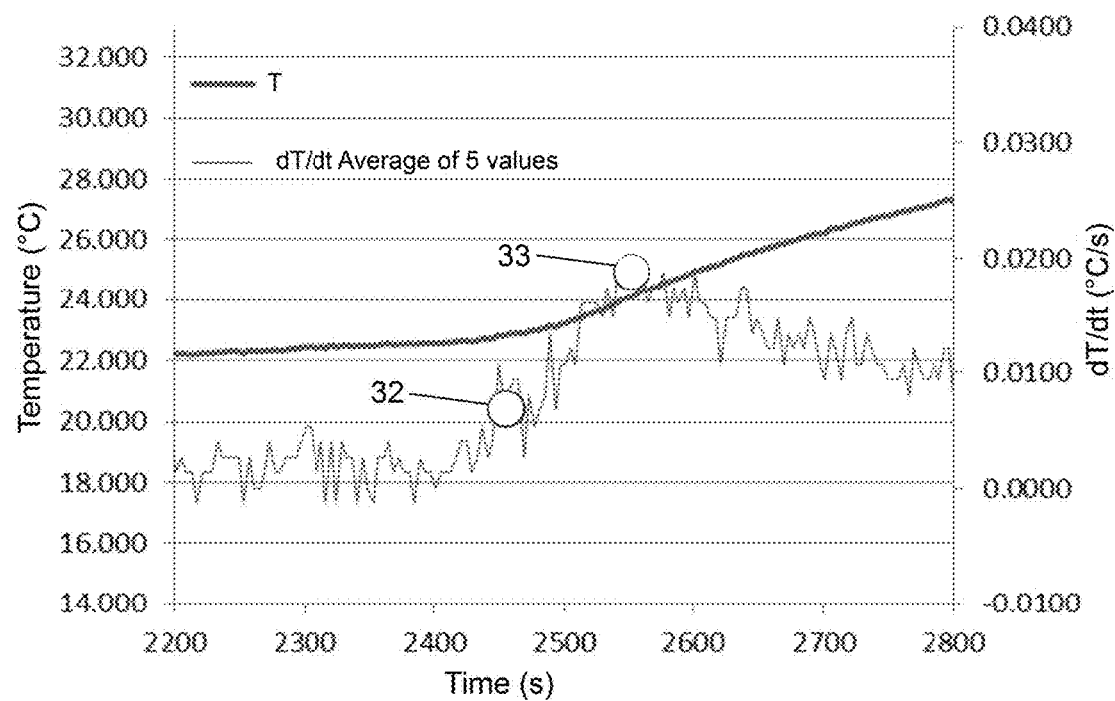
FIG. 7 shows a graph illustrating the change, as a function of time, in the temperature recorded by a temperature sensor of FIG. 2, and also of the derivative of the temperature measured with respect to time (moving average of 5 values), during the implementation of a gauging method according to the invention.

The moment at which the temperature recorded by one of the temperature sensors 191, 192, 193, 194 changes, which indicates the presence of the liquid-gas interface 16 in the tank 10 in the plane of interest associated with said temperature sensor, can otherwise be determined by detecting the break of slope on the digital curve showing the temperature recorded by the temperature sensor as a function of time. This detection can be carried out according to any method conventional in itself for a person skilled in the art. For example, it can be carried out by analysing the temperature derivative with respect to time. By way of example, FIG. 7 shows a graph representing the change as a function of time, on the one hand in the temperature recorded by the temperature sensor C2 192, and on the other hand in the temperature derivative with respect to time.

On the derivative curve, a circle given the reference numeral 32 indicates the moment at which the thermal inertia of the wall 11 of the tank 10, at the location of the temperature sensor 192, begins to decrease. This corresponds to the presence of the outer edge of the meniscus at the location of the temperature sensor. A circle given the reference numeral 33 further indicates the moment at which the thermal inertia of the wall 11 of the tank 10, at the location of the temperature sensor 192, reaches its maximum value. The free liquid surface 16 in the tank 10 and almost all of the meniscus are then located below the plane of interest associated with the temperature sensor.

As stated hereinabove, based on the knowledge obtained by the method according to the invention of the moment I at which the liquid-gas interface 16 in the tank 10 is located in the plane of interest associated with a temperature sensor, for example the temperature sensor C2 192, the corresponding volume of liquid propellant can be easily determined, from the geometrical data of the tank 10, and the known position of the temperature sensor on this tank 10, in a subsequent step of the gauging method according to the invention.

A corresponding mass of propellant can thus be easily determined therefrom.

By way of example, the method according to the invention was applied under the aforementioned operating conditions, using the apparatus specified below.

The tank 10 has the shape of a spherical cylinder of radius 343 mm. The assembly of one or more heating members and of one or more temperature sensors is arranged 55 mm from the bottom of the cylindrical portion.

The propellant analysed is NTO (Nitrogen Tetra Oxide).

Under the thrust conditions applied, the height of the meniscus is 1.26 cm.

The results obtained using the method according to the invention were used to determine a mass of propellant remaining in the tank of the spacecraft after the apogee motor firing, by combining these results with the data produced by the Dead Reckoning method, according to equation (1):

$$m_{BOL}=m_{TM}-(t_{finLAE}-t_{TM})*\dot{m}_{LAE} \qquad (1)$$

wherein the different parameters are as defined hereinabove.

The results obtained were compared to the forecasts obtained using the Dead Reckoning (DR) method. The difference between: the data obtained using the method according to the invention for each of the temperature sensors C1, C2, C3 and C4 by, on the one hand the method of analysing the temperature derivative with respect to time, described hereinabove, and on the other hand the method of determining the moment at which the difference between the temperatures recorded by separate temperature sensors is at its maximum, also described hereinabove, then the application of the equation (1) hereinabove; and the data derived from the Dead Reckoning forecasts (reference remaining mass (DR)), was calculated.

The results obtained are presented in Table 1 hereinbelow.

TABLE 1

Comparison of the mass data obtained by implementing methods according to specific embodiments of the invention and forecast data obtained by the Dead Reckoning (DR) method

| Sensor | Reference remaining mass (DR) (kg) | Determination using the derivative method | | Determination using the difference method | |
|---|---|---|---|---|---|
| | | Mass (kg) | Difference with DR (kg) | Mass (kg) | Difference with DR (kg) |
| C4 | 338.132 | 337.929 | −0.203 | 337.032 | −1.100 |
| C3 | 351.381 | 350.72 | −0.661 | 350.541 | −0.840 |
| C2 | 364.629 | 363.511 | −1.118 | 362.613 | −2.016 |
| C1 | 377.879 | 372.531 | −5.348 | — | — |

The results obtained are shown to be very similar, regardless of the method according to the invention used (derivative or difference method).

Thus, by combining the gauging of the tank using the method according to the invention, with the Dead Reckoning method, knowledge of the quantity of propellant remaining at the end of the apogee motor firing is significantly improved. The method according to the invention thus advantageously allows the forecasts produced using the conventional Dead Reckoning method to be refined as regards the mass of liquid propellant remaining in the tank at the end of the apogee motor firing, thus at the start of the actual mission of the spacecraft.

The invention claimed is:

1. A method for gauging the liquid propellant tank of a spacecraft, said propellant tank comprising a thermally-conductive wall, having a known geometry and containing a volume of liquid propellant, and said spacecraft being equipped with means of propulsion capable of exerting, according to a given thrust axis, a high thrust allowing said spacecraft to achieve an acceleration of greater than or equal to 0.05 m/s$^2$, said method comprising steps of:

during a phase of high-thrust along said thrust axis exerted by said means of propulsion supplied with liquid propellant from said propellant tank, remotely controlling said spacecraft in which are attached, on an outer surface of said outer wall of the tank, a heating member and at least two temperature sensors, each of which is in a known position in proximity to said heating member and arranged on the outer surface of the wall of the propellant tank in a position for measuring the temperature of said wall, in a plane perpendicular to said thrust axis, referred to as plane of interest, in which the liquid-gas interface in said tank is likely to be located at some time during a phase of high-thrust exerted by said means of propulsion along said thrust axis, said temperature sensors being aligned along a so-called measurement axis, the heating member having a height, measured along said measurement axis, that is greater than the height occupied by said temperature sensors along said measurement axis, and a height of the heating member protruding beyond an end temperature sensor being greater than a distance between adjacent temperature sensors arranged along said measurement axis, further comprising the steps of:

heating the wall of the tank using the heating member;

and acquiring measurements of a temperature of the wall of the tank using a first of said temperature sensors, at an acquisition rate of one measurement every 30 seconds or less;

determining a moment I at which the temperature measured by said temperature sensor changes, which corresponds to a moment at which a break of slope occurs on a digital curve representing the temperature recorded by said temperature sensor as a function of time, such a change indicating a presence, in the plane of interest associated with said first temperature sensor, of the liquid-gas interface in the tank;

and determining, from a geometrical data of the tank and the known position of the first temperature sensor on the wall of the tank, the volume of liquid propellant present in said tank at the moment I.

2. The method according to claim 1, wherein determining the moment I at which the temperature measured by said temperature sensor changes is carried out by detecting the moment at which a break of slope occurs on a digital curve representing the temperature recorded by said temperature sensor as a function of time.

3. The method according to claim 1, wherein, in said spacecraft, a plurality of temperature sensors are attached on the outer surface of the wall of the tank, each of said plurality of temperature sensors being arranged on the outer surface of the wall of the propellant tank in a position for measuring the temperature of said wall, in proximity to the heating member and in a plane perpendicular to said thrust axis, referred to as the plane of interest associated with each respective temperature sensor of said plurality of temperature sensors, in which the liquid-gas interface in said tank is likely to be located at some time during a phase of high-thrust exerted by said means of propulsion along said thrust axis, said method comprising, for at least one of said plurality of temperature sensors, steps of:

determining the moment I at which the temperature measured by said at least one of said plurality of temperature sensors changes, which corresponds to the moment at which a break of slope occurs on a digital curve representing the temperature recorded by said at least one of said plurality of temperature sensors as a function of time, said change indicating the presence of the liquid-gas interface in the plane of interest associated with said at least one of said plurality of temperature sensors;

and determining, from the geometrical data of the tank and the known position of the at least one of said plurality of temperature sensors on the wall of the tank, the volume of liquid propellant present in said tank at the moment I.

4. The method according to claim 3, wherein, in said spacecraft, said plurality of temperature sensors are aligned along a so-called measurement axis, parallel to said thrust axis.

5. The method according to claim 1, wherein, in said spacecraft, said temperature sensors are situated at an equal distance from said heating member.

6. The method according to claim 5, wherein, in said spacecraft, said temperature sensors are aligned along a so-called measurement axis, and the heating member has a height, measured along said measurement axis, that is greater than the height occupied by said temperature sensors along said measurement axis.

7. The method according to claim 6, wherein, in said spacecraft, a distance between adjacent temperature sensors arranged along said measurement axis is equal to a distance between two additional adjacent temperature sensors, and a height of the heating member protruding beyond an end temperature sensor is greater than said distance.

8. The method according to claim 5, wherein, in said spacecraft, the distance between two adjacent temperature sensors along said measurement axis, measured according to an axis parallel to the thrust axis, is between 10 and 50 mm.

9. The method according to claim 5, wherein determining the moment I at which the temperature measured by a first of said temperature sensors changes is carried out by:

for said first temperature sensor and for a temperature sensor arranged upstream of said first temperature sensor in the direction of the thrust exerted by the means of propulsion along the thrust axis, remotely controlling said spacecraft in order to carry out simultaneous acquisitions of measurements of the temperature of the wall of the tank, at an acquisition rate of one measurement every 30 seconds or less, for each pair of simultaneous acquisitions, determining the difference between the temperature measured by said upstream temperature sensor and the temperature measured by said first temperature sensor, and determining the moment at which said difference is the highest.

10. The method according to claim 1, further comprising a second heating member, wherein, in said spacecraft, the two heating members are attached on the outer surface of the wall of the tank, on opposing side of said temperature sensor and at an equal distance from said temperature sensor.

11. The method according to claim 1, wherein said spacecraft is remotely controlled by a control device, whereby control signals are successively determined and sent to said spacecraft by the control device in order to carry out the steps of heating the wall of the tank using the heating member and of acquiring measurements of the temperature of the wall of the tank using said temperature sensor.

12. A computer program product, comprising a set of program code instructions which, when executed by a processor, implement the steps of a method for gauging the liquid propellant tank of a spacecraft according to claim 1.

13. The method of claim 1, wherein a proximity location of the at least one temperature sensor is at a location close enough to the heating member wherein the at least one temperature sensor can measure a rise in the temperature of the wall of the tank caused by the heating of the wall by the heating member.

14. A spacecraft comprising:

a propellant tank comprising a thermally-conductive wall and having a known geometry, containing a volume of liquid propellant, means of propulsion capable of exerting, according to a given thrust axis, a high thrust allowing said spacecraft to achieve an acceleration of greater than or equal to 0.05 m/s$^2$, and supplied with liquid propellant from said propellant tank, and a heating member attached on an outer surface of said wall of the tank, wherein the spacecraft comprises at least two temperature sensors attached on said outer surface in proximity to said heating member, said temperature sensors being aligned along a so-called measurement axis parallel to said thrust axis, and each being arranged on the outer surface of the wall of the propellant tank in a position for measuring the temperature of said wall, in a plane perpendicular to said thrust axis, referred to as the plane of interest associated with said temperature sensor, in which the liquid-gas interface in said tank is likely to be located at some time during a phase of high-thrust exerted by said means of propulsion along said thrust axis, and wherein the heating member has a height, measured along said measurement axis, that is greater than the height occupied by said temperature sensors along said measurement axis, and a height of the heating member protruding beyond an end temperature sensor is greater than a distance between adjacent temperature sensors arranged along said measurement axis.

15. The spacecraft according to claim 14, wherein said temperature sensors are situated at an equal distance from said heating member.

16. The spacecraft according to claim 14, wherein the heating member has a height, measured along an axis parallel to said thrust axis, that is greater than the height occupied by said temperature sensors along said measurement axis.

17. The spacecraft according to claim 14, further comprising a second heating member, wherein the two heating members are attached to the outer surface of the wall of the tank, on opposing side of said temperature sensors and at an equal distance from said temperature sensors.

18. The spacecraft according to claim 14, comprising telemetry means suitable for transmitting the temperature values recorded by said temperature sensors to a remote receiver.

19. A system comprising:

the spacecraft according to claim 14, and computing means for determining, from the temperature values recorded by at least one of said temperature sensors, a moment I at which the liquid-gas interface in the tank is located in the plane of interest associated with said temperature sensor, and the volume of liquid propellant present in the tank.

20. The system according to claim 19, wherein:

the spacecraft comprises telemetry means suitable for transmitting the temperature values recorded by said temperature sensors to a remote receiver, and the system comprises the remote receiver capable of receiving the temperature values transmitted by said telemetry means of the spacecraft, and of transferring them to said computing means.

21. The spacecraft of claim 14, wherein a proximity location of the at least two temperature sensors is at a location close enough to the heating member wherein the at least two temperature sensors can measure a rise in the temperature of the wall of the tank caused by the heating of the wall by the heating member.

* * * * *